United States Patent
Gottschalk

(10) Patent No.: US 10,566,590 B2
(45) Date of Patent: Feb. 18, 2020

(54) APPARATUS AND METHOD FOR INCREASING SAFETY WHEN USING BATTERY SYSTEMS

(71) Applicant: Robert Bosch GmbH, Stuttgart (DE)

(72) Inventor: Andy Gottschalk, Rattelsdorf (DE)

(73) Assignee: Robert Bosch GmbH, Stuttgart (DE)

(*) Notice: Subject to any disclaimer, the term of this patent is extended or adjusted under 35 U.S.C. 154(b) by 305 days.

(21) Appl. No.: 15/117,203

(22) PCT Filed: Jan. 5, 2015

(86) PCT No.: PCT/EP2015/050049
§ 371 (c)(1),
(2) Date: Aug. 7, 2016

(87) PCT Pub. No.: WO2015/117772
PCT Pub. Date: Aug. 13, 2015

(65) Prior Publication Data
US 2016/0351871 A1    Dec. 1, 2016

(30) Foreign Application Priority Data

Feb. 10, 2014  (DE) .................. 10 2014 202 348

(51) Int. Cl.
*H01M 2/12* (2006.01)
*H01M 10/052* (2010.01)
(Continued)

(52) U.S. Cl.
CPC ........... *H01M 2/1241* (2013.01); *B32B 37/02* (2013.01); *B32B 37/06* (2013.01); *B32B 37/12* (2013.01);
(Continued)

(58) Field of Classification Search
None
See application file for complete search history.

(56) References Cited

U.S. PATENT DOCUMENTS

2008/0152957 A1* 6/2008 James ................ H01M 8/0271
                                                              429/457
2009/0302005 A1* 12/2009 Kool .................. C23C 18/1834
                                                              216/108
(Continued)

FOREIGN PATENT DOCUMENTS

CN        101501887 A      8/2009
CN        101911337 A      12/2010
(Continued)

OTHER PUBLICATIONS

JPO English abstract for JP7-50159 (Year: 1995).*
(Continued)

*Primary Examiner* — Sin J Lee
(74) *Attorney, Agent, or Firm* — Maginot, Moore & Beck LLP

(57) ABSTRACT

A battery system includes at least one apparatus configured to increase safety when using at least one component of the battery system. The at least one apparatus is configured to degas the at least one component. The at least one component has a degassing opening. The at least one apparatus is configured to be attached to the at least one component by joining, and the at least one apparatus is configured to cover the degassing opening.

20 Claims, 3 Drawing Sheets

(51) Int. Cl.
*H01M 10/0525* (2010.01)
*B32B 37/02* (2006.01)
*B32B 37/06* (2006.01)
*B32B 37/12* (2006.01)
*B32B 38/00* (2006.01)

(52) U.S. Cl.
CPC ......... *B32B 38/004* (2013.01); *H01M 10/052* (2013.01); *H01M 10/0525* (2013.01); *B32B 2310/0418* (2013.01); *B32B 2311/24* (2013.01); *B32B 2323/10* (2013.01); *B32B 2457/10* (2013.01); *H01M 2220/20* (2013.01); *Y02E 60/122* (2013.01)

(56) References Cited

U.S. PATENT DOCUMENTS

| | | | |
|---|---|---|---|
| 2010/0233520 A1 | 9/2010 | Suzuki et al. | |
| 2011/0287286 A1* | 11/2011 | Ahn | H01M 2/1241 429/56 |
| 2012/0114979 A1* | 5/2012 | Kim | H01M 2/1241 429/7 |
| 2014/0205917 A1* | 7/2014 | Mizuno | H01M 12/065 429/405 |
| 2014/0226290 A1* | 8/2014 | Hayashi | H05K 3/4655 361/748 |
| 2014/0377607 A1* | 12/2014 | Urano | H01M 10/0431 429/94 |

FOREIGN PATENT DOCUMENTS

| | | | |
|---|---|---|---|
| CN | 202678441 U | 1/2013 | |
| DE | 10 2008 007 669 A1 | 8/2009 | |
| DE | 10 2009 020 185 A1 | 11/2010 | |
| DE | 10 2010 039 976 A1 | 3/2012 | |
| DE | 10 2012 200 869 A1 | 7/2013 | |
| EP | 1 052 709 A1 | 11/2000 | |
| EP | 2 141 758 A1 | 1/2010 | |
| EP | 2328207 A1 * | 6/2011 | .......... H01M 2/0277 |
| EP | 2 388 846 A1 | 11/2011 | |
| EP | 2 629 351 A1 | 8/2013 | |
| JP | 54-115526 | 8/1979 | |
| JP | 2-12757 A | 1/1990 | |
| JP | H 07-50159 A | 2/1995 | |
| JP | 11-73935 A | 3/1999 | |
| JP | 2010-49883 A | 3/2010 | |
| JP | 2011-060600 A | 3/2011 | |
| JP | 2014-22129 A | 2/2014 | |
| WO | 2013/146803 A1 | 10/2013 | |

OTHER PUBLICATIONS

Derwent English abstract for JP7-50159 (Year: 1995).*
JPO English abstract for JP7-50159 (Yoshino et al) (Year: 1995).*
Machine-English translation for JP7-50159 (Yoshino et al) (Year: 1995).*
International Search Report corresponding to PCT Application No. PCT/EP2015/050049, dated Mar. 26, 2015 (German and English language document) (7 pages).

* cited by examiner

APPARATUS AND METHOD FOR INCREASING SAFETY WHEN USING BATTERY SYSTEMS

This application is a 35 U.S.C. § 371 National Stage Application of PCT/EP2015/050049, filed on Jan. 5, 2015, which claims the benefit of priority to Serial Number DE 10 2014 202 348.3, filed on Feb. 10, 2014 in Germany, the disclosures of which are incorporated herein by reference in their entireties.

BACKGROUND

The present disclosure relates to a battery system and also its use and a method in accordance with the following description.

Battery systems are known from the prior art, wherein the battery systems comprise a degassing apparatus, wherein the degassing apparatus is suitable for dissipating substances that occur in the battery systems. A battery having a protection from neighboring cells in the case of discharging substances from a battery cell is thus disclosed in DE 1020110039976A1, wherein each battery cell comprises a discharging valve that is suitable for discharging gas that has been released in said battery cell.

SUMMARY

The disclosure is based on a battery system, in particular a lithium ion battery system having at least one apparatus for increasing safety when using at least one component of the battery system, wherein the at least one apparatus is suitable for degassing the at least one component and the at least one component comprises a degassing aperture.

The disclosure relates to a battery system, the use of the battery system and a method having the characterizing features of the following description.

The core of the disclosure resides in the fact that the at least one apparatus has been attached to the at least one component by means of an attaching procedure and covers the degassing aperture.

The fact that the at least one apparatus has been attached to the at least one component by means of an attaching procedure and covers the degassing aperture leads to the advantage in accordance with the disclosure of ensuring in a low-cost and reliable manner the increase in safety when using at least one component of the battery system.

The background of the disclosure is the simplification of the production of an apparatus for increasing safety when using a battery system.

The disclosure also relates to the use of a battery system in a vehicle, in particular in a motor vehicle.

In addition, the disclosure relates to a method for increasing safety when using at least one component of a battery system, in particular a lithium ion battery system, wherein the at least one component comprises a degassing apparatus, wherein the at least one apparatus is attached to the at least one component and covers the degassing aperture.

Further advantageous embodiments of the present disclosure are the subject matter of the further description.

According to a first advantageous embodiment of the disclosure, the at least one apparatus comprises a bursting foil, by way of example a metal foil, in particular an aluminum foil, or the at least one apparatus comprises a bursting foil, by way of example a metal foil, in particular an aluminum foil, and an attaching foil, in particular a sealing foil, preferably a polypropylene foil or a so-called PPa-F-Foil® from DNP.

The fact that the at least one apparatus comprises a bursting foil, by way of example a metal foil, in particular an aluminum foil, leads to the advantage in accordance with the disclosure that by virtue of its mechanical characteristics it is possible to adjust the at least one apparatus to suit the technical and/or physical characteristics of the battery system and the at least one component.

The fact that the at least one apparatus comprises a bursting foil, by way of example a metal foil, in particular an aluminum foil, and an attaching foil, in particular a sealing foil, preferably a polypropylene foil or a so-called PPa-F-foil® from DNP leads to the advantage in accordance with the disclosure that by virtue of its mechanical characteristics the at least one apparatus can be adjusted to suit the technical and/or physical characteristics of the battery system and the at least one component, said characteristics being preferably a pressure and/or a temperature that prevails in an interior of the battery system. Furthermore, the attaching procedure when using the attaching foil can be performed with little expenditure. In addition, by means of the fact that the at least one apparatus comprises a bursting foil, by way of example a metal foil, in particular an aluminum foil, and an attaching foil, in particular a sealing foil, preferably a polypropylene or a so-called PPa-F-Foil® from DNP it is possible in an advantageous manner in accordance with the disclosure to adjust the at least one apparatus to suit the respective battery system: In dependence upon the physical circumstances that prevail in the interior of the battery system, by way of example pressure and/or temperature, it is possible to select and influence the physical, chemical and technical quality of the at least one apparatus. In addition, the at least one apparatus can be designed by way of example in dependence upon the chemical qualities of substances that are located in the interior of the battery and can preferably be embodied as chemically resistant with respect to in particular these substances and/or as flame retardant. Furthermore, this at least one apparatus offers the advantage that in dependence upon the physical characteristics of the bursting foil and attaching foil, a rupture or break up of the at least one apparatus can be determined with regard to the duration of the rupture or the duration of the break or the magnitude of the rupture or the magnitude of the break.

In accordance with a next advantageous embodiment of the disclosure, the thickness of the bursting foil is 25 µm to 150 µm and/or the thickness of the attaching foil is 25 µm to 150 µm.

The fact that the thickness of the bursting foil and/or the thickness of the attaching foil is 25 µm to 150 µm leads to the advantage in accordance with the disclosure that the at least one apparatus can be designed according to the physical and chemical characteristics of the battery system, preferably a pressure and/or a temperature that prevails in the interior of the battery system.

According to a further advantageous embodiment of the disclosure, the degassing aperture is a bursting aperture, in particular a bursting tongue.

In accordance with a further advantageous embodiment of the disclosure, the attaching procedure is an adhesive, a laminating or a gluing procedure.

By virtue of the fact that the attaching procedure is an adhesive, a laminating or a gluing procedure, it is possible to perform the attaching procedure in a controlled and reliable and simple manner.

According to a next preferred embodiment of the disclosure, prior to attaching the at least one apparatus to the at least one component, at least one surface of the at least one component is roughened or at least one surface of the at least one component is cleared of oils and/or fats and in a subsequent step, the at least one surface is roughened.

The step of clearing the at least one surface of oils and/or fats leads to the advantage in accordance with the disclosure of an increased durability of the attachment. The background is the avoidance of oils and fats that have the effect of reducing the adhesion.

The step of roughening the at least one surface leads likewise to the advantage in accordance with the disclosure of increasing the durability of the attachment.

In accordance with a further, advantageous embodiment of the disclosure, the at least one surface is mechanically or chemically roughened, in particular using the effects of an acid or an alkaline solution.

According to a next advantageous embodiment of the disclosure, the at least one surface is heated to a temperature of 160° C. to 210° C. prior to attaching the at least one apparatus.

The step of heating the at least one surface to a temperature of 160° C. to 210° C. prior to attaching the at least one apparatus leads to the advantage in accordance with the disclosure of being able to perform the attaching procedure in a rapid and reliable manner.

In accordance with a further advantageous embodiment of the disclosure, initially an attaching foil and then a bursting foil or a composite of the attaching foil and the bursting foil is attached to the at least one surface of the at least one component, wherein the attaching foil and the bursting foil or the composite of the attaching foil and bursting foil cover the degassing aperture of the at least one component.

The approach of initially attaching the attaching foil and in a subsequent step attaching the bursting foil to the at least one surface leads to the advantage in accordance with the disclosure of being able to perform the attaching procedure in a controlled manner. In particular, where necessary, defective attaching foils or bursting foils can be better identified and replaced in the case of attaching said foils separately one after the other.

The approach of attaching a composite of the attaching foil and the bursting foil to the at least one surface leads to the advantage in accordance with the disclosure of accelerating the attaching procedure by means of the common attachment procedure of the attaching foil and the bursting foil in one step.

In accordance with a further advantageous embodiment of the disclosure, the attaching foil and the bursting foil or the composite of the attaching foil and the bursting foil is pressed by means of a pressing apparatus, in particular a pressing apparatus that comprises a temperature of 160° C. to 210° C., onto the surface of the at least one component. The fact that the pressing apparatus comprises a temperature of 160° C. to 210° C. leads to the advantage of not influencing the attaching procedure in a negative manner.

According to a further advantageous embodiment of the disclosure, the at least one component is cooled to a temperature of 20° C. to 40° C. after the attaching procedure.

The step of cooling of the at least one component to the temperature of 20° C. to 40° C. after the attaching procedure leads to the advantage in accordance with the disclosure of being able to conclude the attaching procedure in a reliable manner and as much as possible ruling out undesired mechanical deformation of the at least one apparatus, in particular any deformation that is possible at high temperatures.

BRIEF DESCRIPTION OF THE DRAWINGS

The disclosure is explained hereinunder with reference to exemplary embodiments in which further features are evident that are not limiting to the disclosure in its scope. The exemplary embodiments are illustrated in the figures.

In the figures.

DETAILED DESCRIPTION

Figure 1:
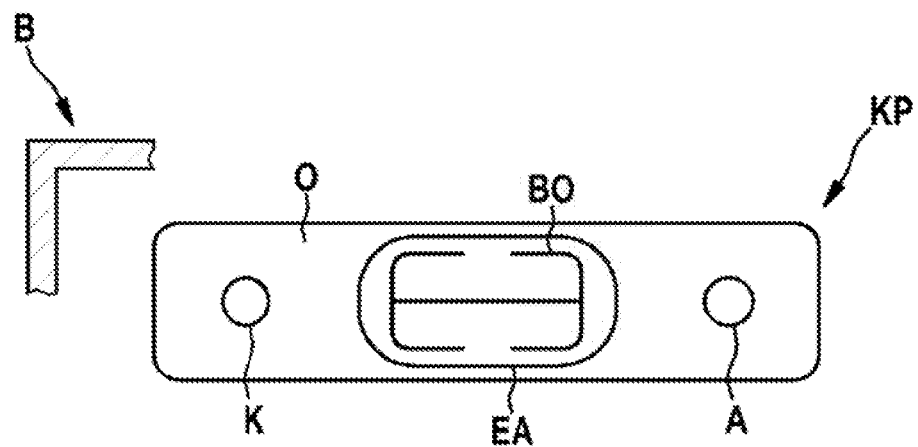
FIG. 1 illustrates a schematic plan view of a battery system in accordance with a first embodiment of the present disclosure.

FIG. 1 illustrates schematically a battery system in accordance with a first embodiment. The battery system is referred to as B. KP refers to at least one component of the battery system B. The at least one component KP of the battery system B comprises a degassing aperture that is referred to as BO. The degassing aperture BO is suitable where necessary for dissipating substances that occur within the at least one component KP, in particular gases.

The at least one component KP of the battery system B can be in particular a battery apparatus, a battery module or a battery cell. O refers to a surface of the at least one component KP.

K refers to a cathode, A refers to an anode of the at least one component KP. The surface O of the at least one component KP can be in particular spatially delimited, preferably by means of an end stop that is referred to as EA in terms of delimiting the run-off or blocking the run-away, wherein the spatial boundary is suitable for preventing attaching substances flowing away. Attaching substances can be by way of example means that are suitable for attaching at least one apparatus to the at least one component KP.

Figure 2:
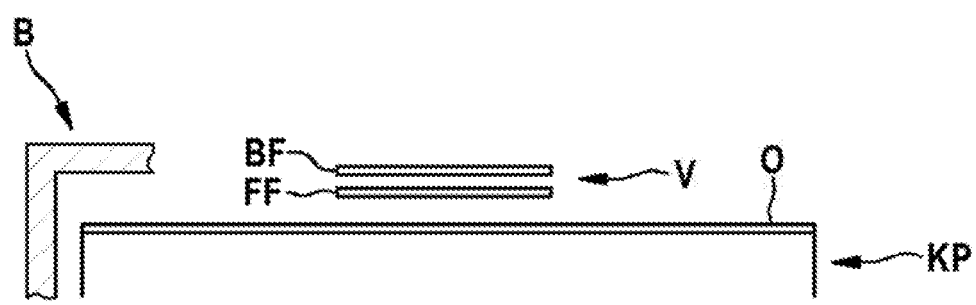
FIG. 2 illustrates a schematic sectional view of the battery system in accordance with the disclosure and at least one apparatus for degassing at least one component of a battery system and for increasing safety when using the at least one component of the battery system prior to said at least one apparatus being attached to at least one component of the battery system.

FIG. 2 illustrates schematically the surface O of at least one component KP of the battery system B. V refers to at least one apparatus for increasing safety when using the at least one component KP of the battery system B. BF refers to a bursting foil that is suitable for bursting under the effect of pressure, this effect of pressure can be as a result of pressure of by way of example 2 bar to 12 bar. FF refers to an attaching foil that is suitable for attaching to the surface O of the at least one component KP. The bursting foil BF and the attaching foil FF are components of the at least one apparatus V. In the schematically illustrated state of the battery system B that is illustrated in FIG. 2, the at least one apparatus V has not yet been attached to the at least one component KP by means of an attaching procedure and does not yet cover the degassing aperture that is not yet visible in FIG. 2. The at least one component KP can be in particular spatially delimited, preferably by means of an end stop EA in terms of delimiting the run-off or blocking the run-away, wherein the spatial boundary is suitable for preventing attaching substances flowing away. Attaching substances are means that are suitable for attaching the at least one apparatus V to the at least one component KP.

Figure 3:
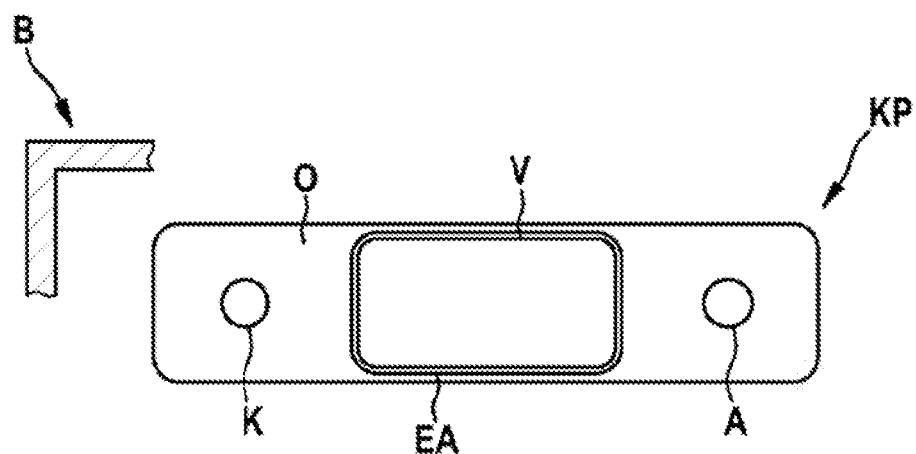
FIG. 3 illustrates a schematic plan view of the battery system in accordance with the first embodiment, wherein at least one apparatus for increasing safety when using at least one component of a battery system has been attached to at least one component by means of an attaching procedure and covers a degassing aperture.

FIG. 3 illustrates schematically the battery system in accordance with the first embodiment, wherein the at least one apparatus that is referred to as V has been attached to at least one component that is referred to as KP by means of an attaching procedure. The battery system in accordance with the disclosure is referred to as B. The at least one apparatus V is suitable for degassing the at least one component KP. K refers to a cathode, A refers to an anode of the at least one component KP. O refers to a surface of the at least one component KP. In the state of the battery system B that is illustrated schematically in FIG. 3, the at least one apparatus V has been attached to the at least one component KP by means of an attaching procedure and covers the degassing aperture BO that is not visible in FIG. 3.

The at least one component KP can be in particular spatially delimited, preferably by means of an end stop EA in terms of limiting run-off or blocking run-away, wherein the spatial boundary is suitable for preventing attaching substances flowing away. Attaching substances are by way of example means that are suitable for attaching the at least one apparatus V to the at least one component KP.

Figure 4:
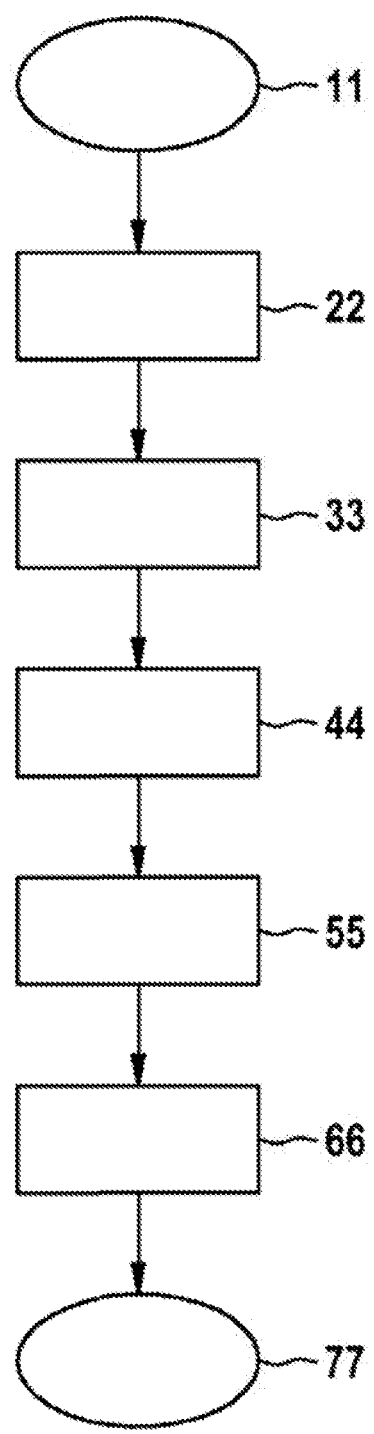
FIG. 4 illustrates schematically the method in accordance with the disclosure for increasing safety when using at least one component of a battery system, in particular a lithium ion battery system.

FIG. 4 illustrates schematically a method for increasing safety when using at least one component of a battery system, in particular a lithium ion battery system. The at least one component of the battery system can be a battery apparatus, a battery module and/or a battery cell. The method is started with method introduction step 11. Where necessary, in the removal step 22 at least one surface of at least one component is cleared of oils and/or fats. In a subsequent roughening step 33, the at least one surface of the at least one component is roughened, the roughening step can be performed in a mechanical manner or in a chemical manner, in particular using the effects of an acid or an alkaline solution. In a subsequent heating step 44, the at least one surface is heated to a temperature of by way of example 160° C. to 210° C. In the subsequent attaching step 55, either a composite of an attaching foil and a bursting foil or initially an attaching foil and subsequently a bursting foil are attached to the at least one component. The attaching foil and bursting foil or the composite of the attaching foil and bursting foil cover/covers a degassing aperture of the at least one component. The procedure of attaching the attaching foil and the bursting foil and the composite of the attaching foil and the bursting foil can be performed in particular under the effect of pressure by way of example under a pressure of 0.5 bar to 10 bar. The at least one component is cooled in a subsequent cooling step 66. The temperature to which the at least one component is cooled is by way of example 20° C. to 40° C. The method is terminated with method terminating step 77.

Figure 5:
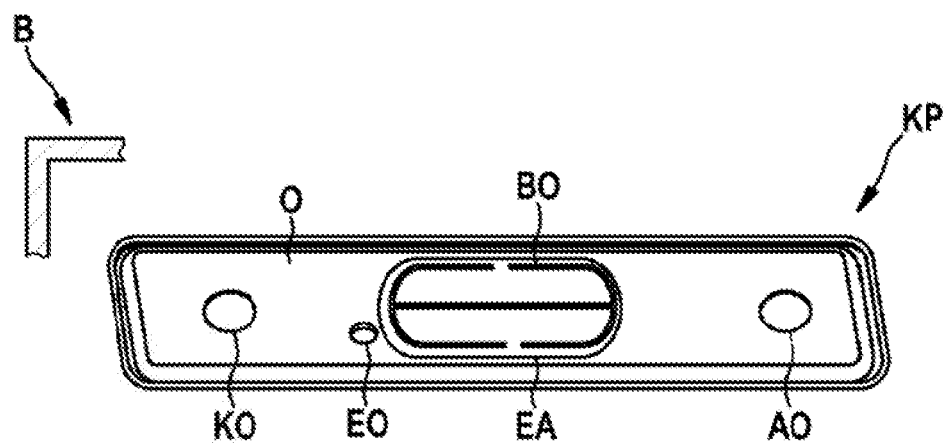
FIG. 5 illustrates a schematic plan view of a battery system in accordance with a second embodiment of the present disclosure.

FIG. 5 illustrates schematically a battery system in accordance with a second embodiment. B refers to the battery system. KP refers to at least one component of the battery system B. The at least one component KP of the battery system B comprises a degassing aperture that is referred to as BO. The degassing aperture BO is suitable where necessary for dissipating substances that occur within the at least one component KP, in particular gases.

The at least one component KP of the battery system B can be in particular a battery apparatus, a battery module or a battery cell. O refers to a surface of the at least one component KP.

KO refers to a first aperture in the surface of the at least one component KP, in particular a first aperture in the surface of the at least one component KP, said aperture being suitable for inserting a cathode (not illustrated) of the battery system B.

AO refers to a second aperture in the surface of the at least one component KP, in particular a second aperture in the surface of the at least one component KP, said aperture being suitable for inserting an anode (not illustrated) of the battery system B.

EO refers to a third aperture in the surface of the at least one component KP, in particular a third aperture in the surface of the at least one component KP, said aperture being suitable for filling or discharging a substance into or out the battery system B. The substance can be in particular an electrolyte.

The at least one component KP can be in particular spatially delimited, preferably by means of an end stop EA in terms of delimiting the run-off or blocking the run-away, wherein the spatial boundary is suitable for preventing the attaching substances flowing away. The attaching substances by way of example are means that are suitable for attaching at least one apparatus to the at least one component KP.

Figure 6:
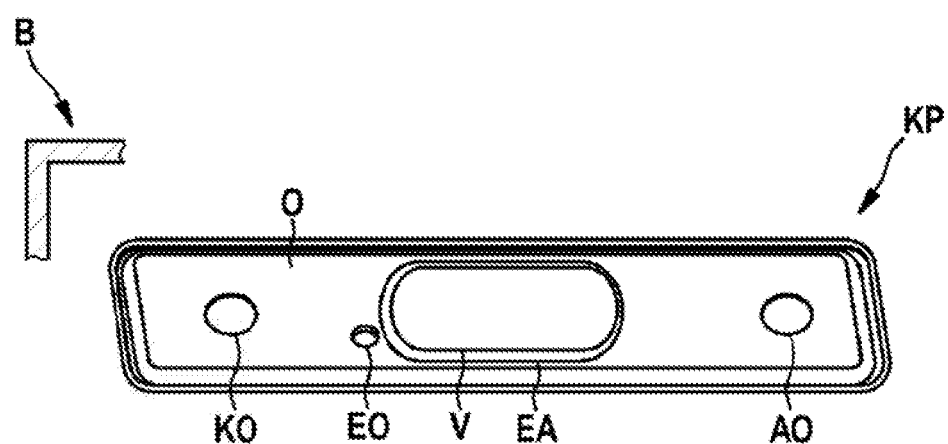
FIG. 6 illustrates a schematic plan view of a battery system in accordance with the second embodiment, wherein at least one apparatus for degassing at least one component of a battery system and for increasing safety when using the at least one component of the battery system has been attached to at least one component by means of an attaching procedure and covers a degassing aperture.

FIG. 6 illustrates schematically a battery system in accordance with the disclosure in accordance with a third embodiment. B refers to the battery system in accordance with the disclosure, V refers to an apparatus for increasing safety. KP refers to at least one component of the battery system B. O refers to a surface of the at least one component KP. KO refers to a first aperture in the surface of the at least one component KP, in particular a first aperture in the surface of the at least one component KP, said aperture being suitable for inserting a cathode (not illustrated) of the battery system B.

AO refers to a second aperture in the surface of the at least one component KP, in particular a second aperture in the surface of the at least one component KP, said aperture being suitable for inserting an anode (not illustrated) of the battery system B.

EO refers to a third aperture in the surface of the at least one component KP, in particular a third aperture in the surface of the at least one component KP, said aperture being suitable for filling or discharging a substance into or out the battery system B. The substance can be in particular an electrolyte.

In the state of the battery system B that is illustrated in FIG. 6, the at least one apparatus V has been attached to the at least one component KP by means of an attaching procedure and covers the degassing aperture that is not visible in FIG. 6.

The at least one component KP can be in particular spatially delimited, preferably by means of an end stop EA in terms of limiting run-off or blocking run-away, wherein the spatial boundary is suitable for preventing attaching substances flowing away. The attaching substances are by way of example means that are suitable for attaching the at least one apparatus V to the at least one component KP.

The invention claimed is:

1. A method for increasing safety when using at least one component of a battery system, the at least one component including a degassing aperture, the method comprising:
   roughening at least one surface of the at least one component;
   after roughening the at least one surface of the at least one component, attaching at least one apparatus of the battery system to the at least one component, wherein attaching the at least one apparatus to the at least one component includes attaching an attaching foil and a bursting foil to the at least one surface so that the attaching foil covers the degassing aperture, and so that the bursting foil at least partially covers the attaching foil,
   wherein attaching the attaching foil and the bursting foil or the composite of the attaching foil and the bursting foil includes pressing the attaching foil and the bursting foil or the composite of the attaching foil and the bursting foil onto the at least one surface of the at least one component with a pressing apparatus.

2. The method as claimed in claim 1, wherein attaching the at least one apparatus to the at least one component includes performing one of an adhesive procedure, a laminating procedure, and a gluing procedure.

3. The method as claimed in claim 1, wherein roughening the at least one surface includes one of mechanically roughening and chemically roughening the at least one surface.

4. The method as claimed in claim 3, wherein roughening the at least one surface includes chemically roughening the at least one surface using one of an acid and an alkaline solution.

5. The method as claimed in claim 1, further comprising: heating the at least one surface to a temperature of between 160° C. and 210° C. prior to attaching the at least one apparatus to the at least one component.

6. The method as claimed in claim 1, further comprising cooling the at least one component to a temperature of between 20° C. and 40° C. after attaching the at least one apparatus to the at least one component.

7. The method as claimed in claim 1, wherein the at least one surface of the at least one component is cleared of at least one of oils and fats before the at least one surface is roughened.

8. The method as claimed in claim 1, wherein the pressing apparatus comprises a temperature of between 160° C. and 210° C.

9. The method of claim 1, wherein:
   the attaching foil is a sealing foil; and
   attaching the at least one apparatus to the at least one component includes sealing the degassing aperture with the sealing foil.

10. The method of claim 1, wherein the attaching foil is formed from a first material and the bursting foil is formed form a second material different than the first material.

11. A battery system, comprising:
    at least one component including a degassing aperture; and
    at least one apparatus configured to increase safety when using the at least one component of the battery system, wherein:
       the at least one apparatus includes:
          an attaching foil that covers the degassing aperture; and
          a bursting foil that at least partially covers the attaching foil; and
       the at least one apparatus is configured to degas the at least one component,
       wherein the bursting foil is a metal foil.

12. The battery system as claimed in claim 11, wherein at least one of a thickness of the bursting foil and a thickness of the attaching foil is between 25 μm and 150 μm.

13. The battery system as claimed in claim 11, wherein the battery system is configured to be used in a vehicle.

14. The battery system as claimed in claim 11, wherein the bursting foil is an aluminum foil.

15. The battery system of claim 11, wherein the attaching foil is a sealing foil that seals the degassing aperture.

16. The battery system of claim 11, wherein the attaching foil is formed from a material different than the metal foil of the bursting foil.

17. A battery system, comprising:
    at least one component including a degassing aperture; and
    at least one apparatus configured to increase safety when using the at least one component of the battery system, wherein:
       the at least one apparatus includes:
          an attaching foil that covers the degassing aperture; and
          a bursting foil that at least partially covers the attaching foil; and
       the at least one apparatus is configured to degas the at least one component,
       wherein the attaching foil is a polypropylene foil.

18. The battery system as claimed in claim 17, wherein at least one of a thickness of the bursting foil and a thickness of the attaching foil is between 25 μm and 150 μm.

19. The battery system of claim 17, wherein the attaching foil is a sealing foil that seals the degassing aperture.

20. The battery system of claim 17, wherein the bursting foil is formed from a material different than the polypropylene foil of the attaching foil.

* * * * *